United States Patent [19]

Cross

[11] Patent Number: 4,803,778

[45] Date of Patent: Feb. 14, 1989

[54] METHOD FOR MAKING A WIRE HARNESS

[75] Inventor: Dan A. Cross, Seattle, Wash.

[73] Assignee: The Boeing Company, Seattle, Wash.

[21] Appl. No.: 87,733

[22] Filed: Aug. 19, 1987

Related U.S. Application Data

[60] Division of Ser. No. 798,827, Nov. 18, 1985, Pat. No. 4,715,100, and a continuation-in-part of Ser. No. 741,318, Jun. 4, 1985, Pat. No. 4,677,734, which is a continuation-in-part of Ser. No. 539,768, Oct. 7, 1983, Pat. No. 4,520,966.

[51] Int. Cl.$^4$ ............................................. H01R 43/00
[52] U.S. Cl. .................................... 29/857; 29/33 M; 29/747; 29/755
[58] Field of Search ................. 29/857, 861, 747, 748, 29/755, 33 M; 227/84; 226/126, 134, 149, 150, 151, 162

[56] References Cited

U.S. PATENT DOCUMENTS

| | | | |
|---|---|---|---|
| 3,705,347 | 12/1972 | Fuller | 29/755 |
| 3,706,134 | 12/1972 | Sweeney | 29/755 |
| 4,029,006 | 6/1977 | Mercer | 101/35 |
| 4,566,502 | 1/1986 | Kellogg | 269/903 |
| 4,638,558 | 1/1987 | Eaton | 29/861 |
| 4,653,159 | 3/1987 | Henderson et al. | 29/33 M |
| 4,658,503 | 4/1987 | Eaton | 29/857 |

*Primary Examiner*—Gil Weidenfeld
*Assistant Examiner*—Daniel W. Howell
*Attorney, Agent, or Firm*—John C. Hammar

[57] ABSTRACT

In the method of the present invention, a wire routing tool grasps a wire, inserts one end into a connector, routes the wire along a predetermined path to another end connector under the control of a robot, and inserts the second end into that connector. The trailing end of the wire is detected with a circuit using an electrostatic technique. The tool can move the wire along a predetermined linear path to effectuate the connection.

10 Claims, 14 Drawing Sheets

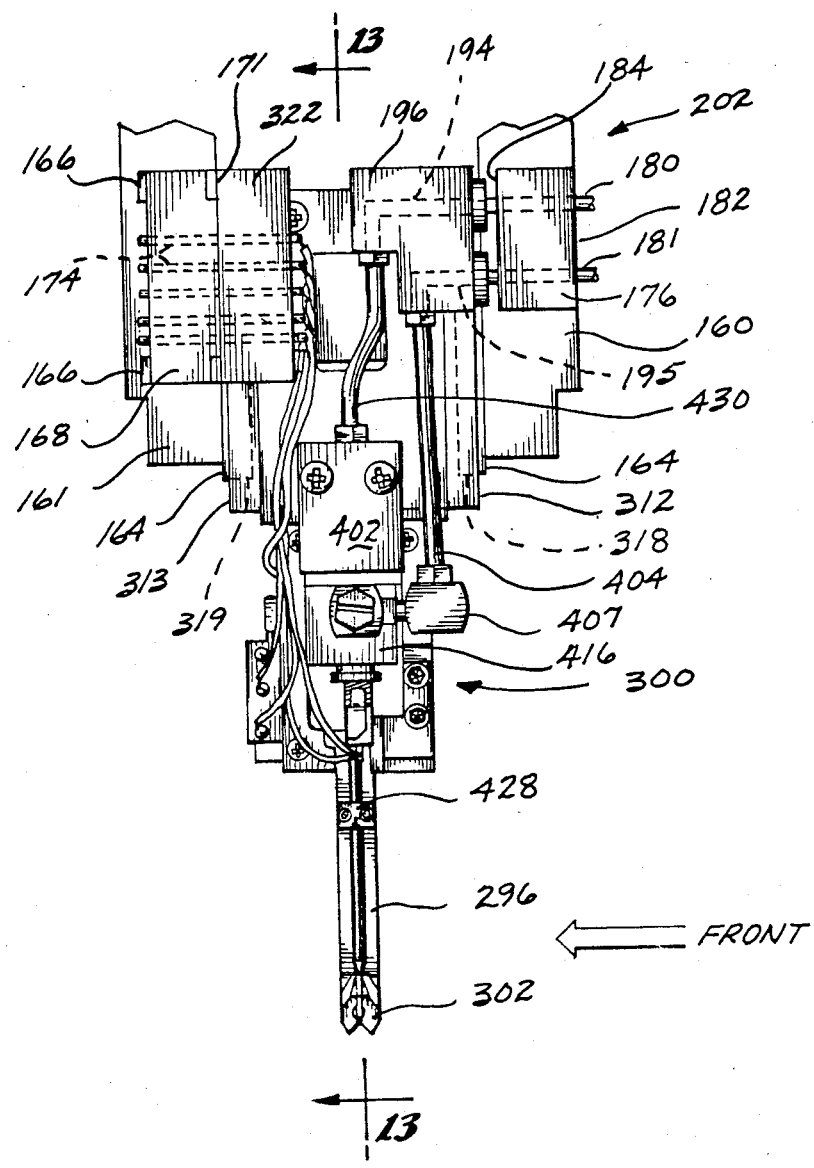

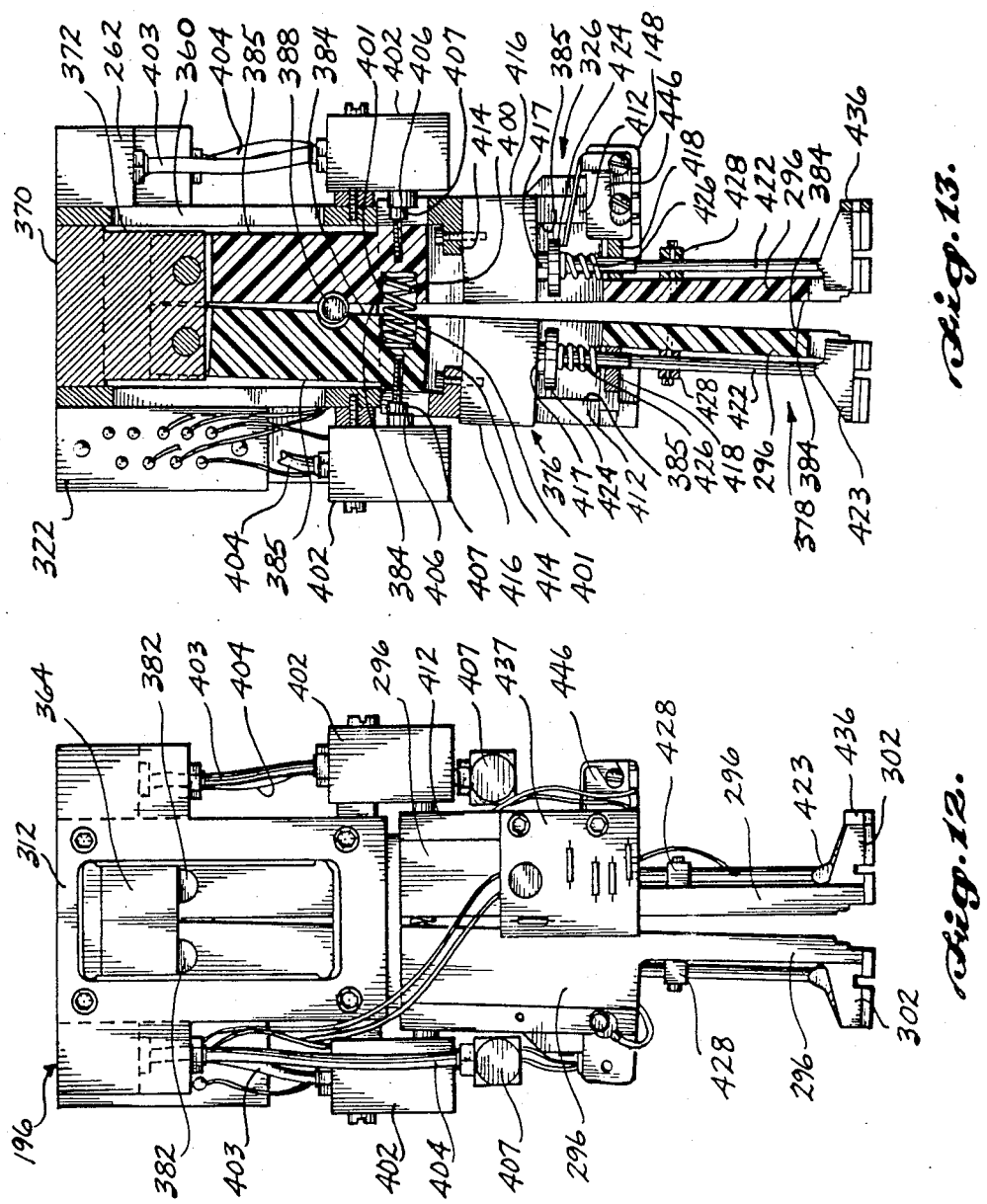

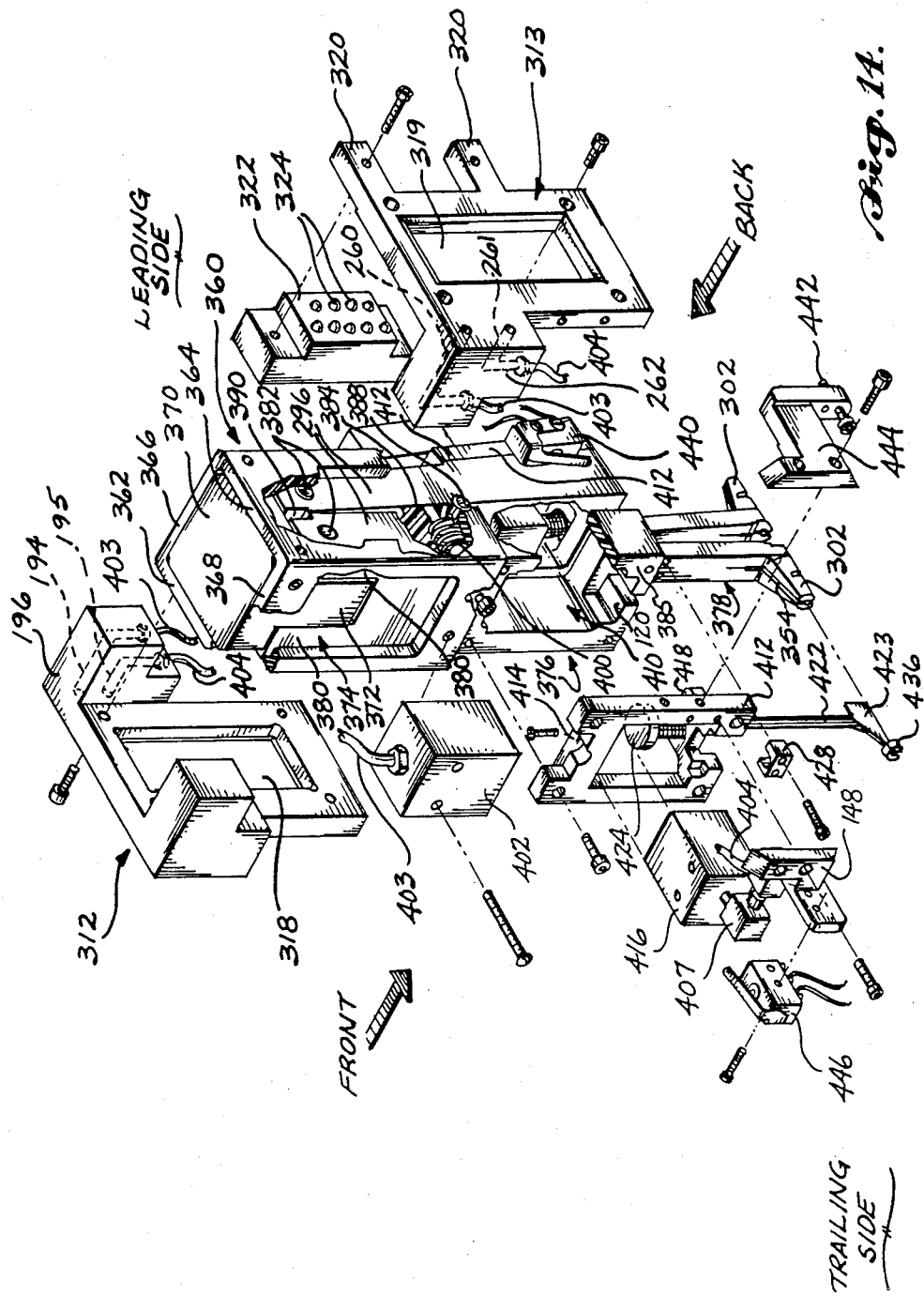

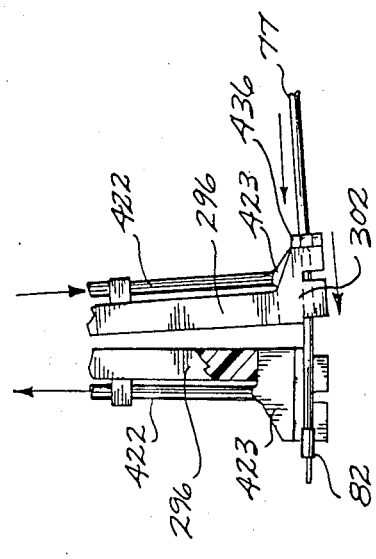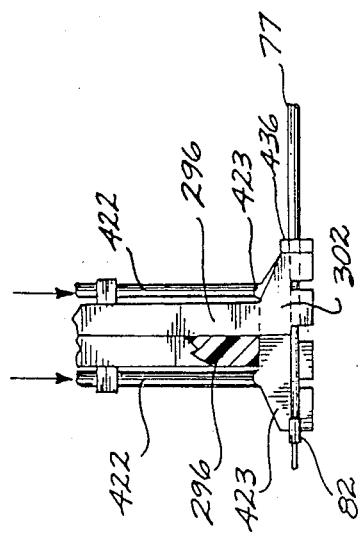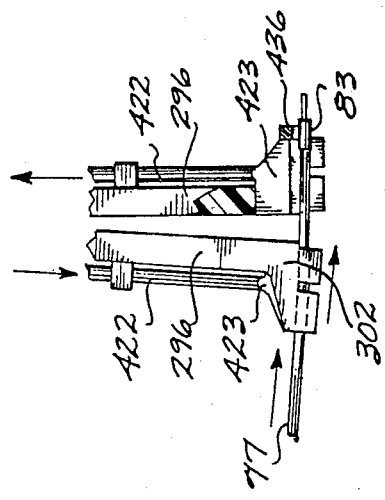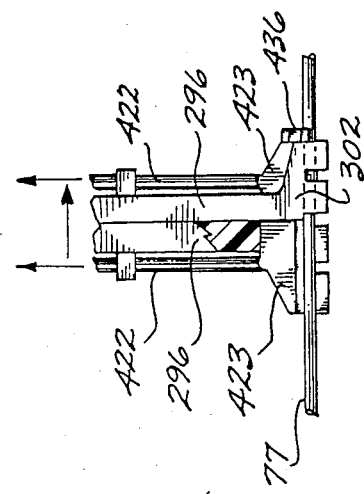

METHOD FOR MAKING A WIRE HARNESS

The United States Government has rights in this invention pursuant to Contract No. DAAH01-82-D-0013-0003 awarded by the U.S. Army.

RELATED APPLICATIONS

This application is a divisional application based upon Ser. No. 798,827, filed Nov. 18, 1985, now U.S. Pat. No. 4,715,100, issued Dec. 29, 1987, and a continuation-in-part of an application filed June 4, 1985, Ser. No. 741,318, entitled Robotic Wire Harness Assembly System now U.S. Pat. No. 4,677,734, issued July 7, 1987, which is a continuation-in-part based upon Ser. No. 539,768, filed Oct. 7, 1983, now U.S. Pat. No. 4,520,966.

FIELD OF THE INVENTION

This invention relates to a method for automated assembly of a wire harness.

BACKGROUND OF THE INVENTION

A wire harness is a bundle of wires that can be handled as an element and can be easily installed to interconnect components of various electrical and electronic systems. The shape of a wire harness is dictated by the environment for the harness and the particular location of connections for the harness. Accordingly, a wire harness often includes one or more bends and branches for routing various wire segments of the harness to their corresponding connection points.

A harness often includes 50 or more wires, each uniquely terminated and uniquely positioned. It is important that each wire extend from a predetermined position on one connector to the corresponding position on a second connector. Bends must be formed into each wire during layup or the final product since it is difficult to bend the assembled bundles of wires.

When done manually, the wires are cut to length after being inserted into the originating connectors and being laid up in the necessary path. Each wire must be identified so that the technician can place the correct wire in the correct contact. Even for simple harnesses, the manual assembly of wire harnesses is extremely labor intensive.

SUMMARY OF THE INVENTION

Robotics in manufacturing has recently led to research and development of robotic systems for assembling wire harnesses. To achieve robotized assembly, special tools for handling the wire had to be developed, since the lengths of wire were difficult to handle without some precise control. While robots can move in predefined paths, they are not intelligent and cannot make even rather minor course corrections. Therefore, the tools necessarily were designed to overcome the variations that would undoubtedly occur so that the preciseness of the robot motion could still be utilized.

This invention is directed to a method using a wire routing tool that is adapted to be carried by a robot, such as the IBM 7565 robot, for sequentially positioning wire segments in a predetermined configuration in a wire harness. The various functions performed by the tool include installing one end of a precut wire segment to an electrical connector that is positioned on a wire harness form board; routing the wire segment along its proper path; and installing the second end of the wire segment to a second connector are similar termination. To perform these functions, the tool is adapted for selectively grasping and dispensing the wire segment.

In its broadest aspect, the present invention relates to a method using a tool for grasping a wire segment and for moving that wire along a predefined spatial line so that an end can be inserted into a connector. The tool also allows the wire to slide freely when the robot traces the path between the lead connector and terminal connector when positioning the wire in a harness.

BRIEF DESCRIPTION OF THE DRAWINGS

FIG. 11 is a side view of a preferred routing tool;

FIG. 12 is a front view of the routing tool of FIG. 11;

FIG. 13 is a front sectional view of the routing tool taken generally along line 13—13 of FIG. 11;

FIG. 14 is an exploded view of the tool of FIG. 11;

FIGS. 15 through 18 depict movement of the wire within the tool;

DETAILED DESCRIPTION

A. System Overview

Figure 1:
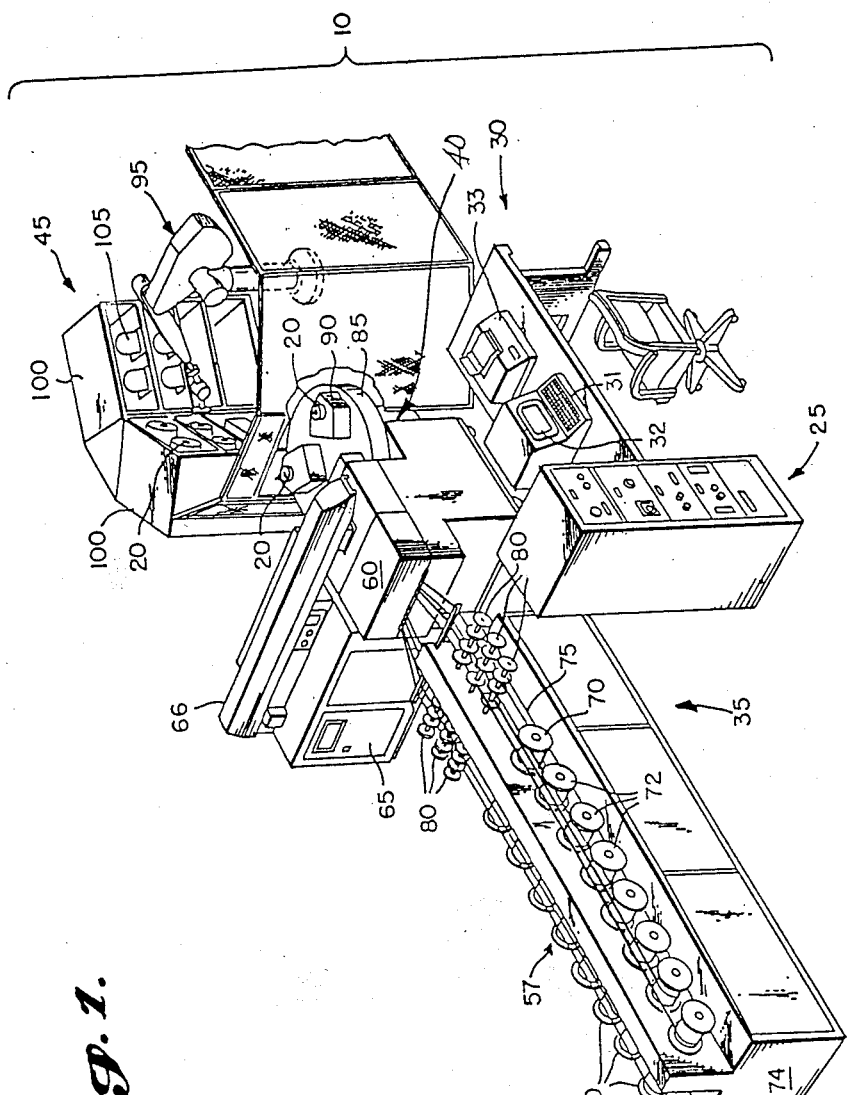
FIGS. 1 and 2 illustrate a robotic wire harness assembly system using the wire routing tool of this invention.
Figure 2:
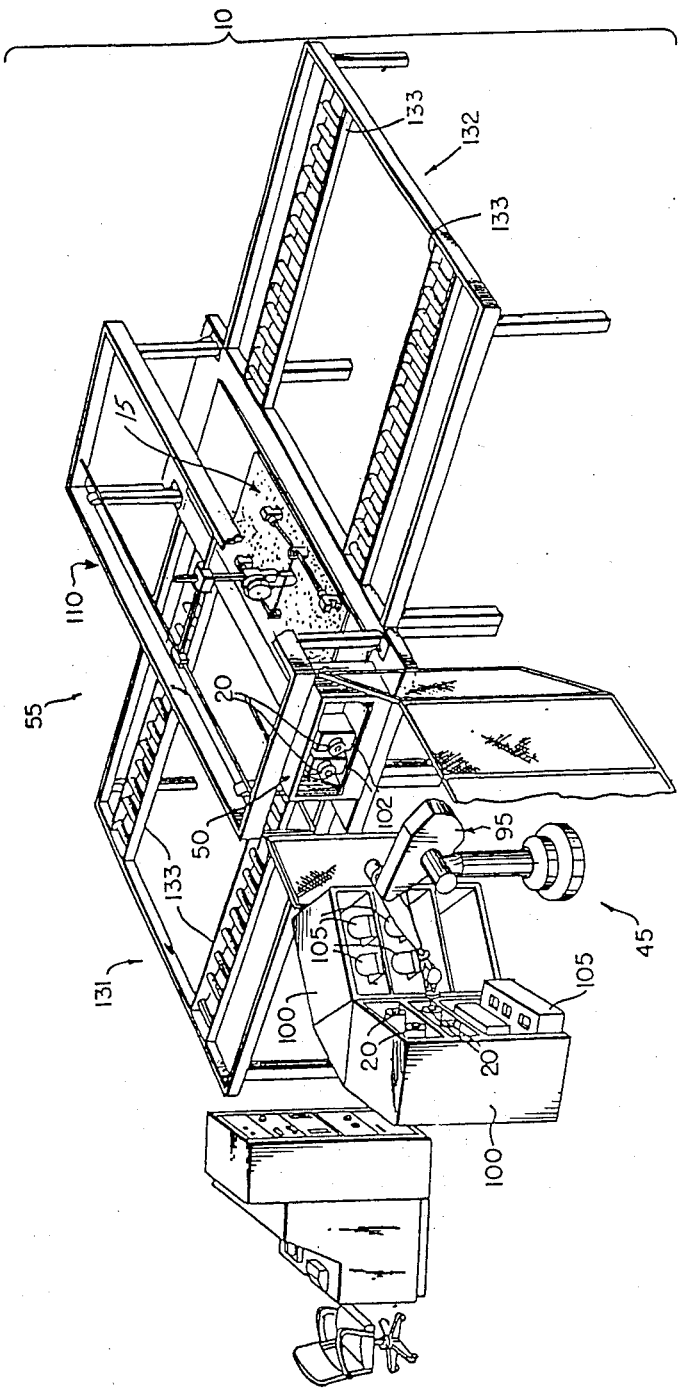

As shown in FIGS. 1 and 2, the system 10 is an integrated combination of hardware and software capable of producing an electrical wire harness 15. Data necessary for controlling each subsystem of the system 10 is generated in an off-line CAD computer and is transmitted from the computer to a control system 30, which includes: a master system computer 25; data input devices (such as keyboard 31); and data output devices (such as a CRT 32 and printer 33). The system computer 25 supplies control signals to a wire preparation subsystem 35, a wire reeling subsystem 40, a wire termination subsystem 45, a wire queuing subsystem 50, and a wire layup subsystem 55, as described in U.S. Pat. No. 4,520,966 and U.S. patent application Ser. No. 741,318, now U.S. Pat. 4,677,734, the disclosure of which hereby are incorporated by reference.

The master system computer 25, preferably an INTEL 86/380 segmented into six internal computers, converts input engineering data from an associated VAX data generator computer and keyboard 31 into processing commands required to operate the assembly system components in the several subsystems for assembly of a wire harness. The control commands are distributed to appropriate subsystem controllers (which command and monitor each step of the harness assembly process). The input and output devices included with the control system 30 allow the operator to communicate with the subsystems to directly control the sequence of activity in the system 10, to input additional commands manually, or to override the data generator input or master system computer.

The wire preparation subsystem 35 uses a commercial WESTLAND Laser Cable Marking System, to mark and cut wire segments. The system includes a wire de-reeling station 57, a marker/cutter unit 60, and a control computer (not shown). Generally, a slave to the master system computer, the WESTLAND control computer allows direct control of the subsystem, if desired. The wire de-reeling station 57 holds a plurality of wires of different dimensions and different types on several, replaceable wire reels or spools 70, and allows selection of the desired wire by the marker/cutter unit 60. The spools 70 are journalled onto shafts 72 extending through the base 74 of the de-reeling station 57. Wires 75 are tensioned by a series of idler and tensioning pulleys 80 on the base 74 and are pulled to the marker/cutter 60 by a positive feed drive roller (not shown) in the unit 60.

The marker/cutter unit 60 also includes an alignment system for drawing a selected wire onto the drive rollers, a laser 66 of suitable power, and associated control and targeting equipment (not shown) to print identification markings on the wire. A guillotine blade actuator (not shown) cuts the continuous wire into wire segments. Each segment has a unique length. Specifically, for a plurality of wire segments in a wire harness extending between two end connectors, the length of each wire segment in the harness depends upon its location within the harness. For any particular wire harness assembled in accordance with this invention, input data describes the precise position that each wire segment will assume in the harness and the precise length of that wire. The wire preparation subsystem 35 selects, marks, measures, and cuts the wire 75 while feeding cut segments into the wire reeling subsystem 40.

In the wire reeling subsystem 40 each wire segment is wound into an individual wire canister 20 that can be easily handled by a robot during the remaining steps of the harness assembly.

The wire termination subsystem 45 includes a MERLIN robot 95, which swivels to pick up a loaded canister 20 from the wire reeling subsystem 40 and present either the leading end 76 or the trailing end 78 of the wire segment 77 to one or more of several termination devices 105, located in a rack 100, which terminate the ends of the wires. After both wire ends are properly terminated, the robot 95 places the canister 20 in a receiving bay 102 of the wire queuing subsystem 50, releases the canister, picks up an empty canister from an adjacent bay 102, and returns the empty canister to the wire reeling subsystem.

The wire layup subsystem 55 includes an IBM Model 7565 robot 110; a clamp 210, which carries a canister 20 during wire routing operations; and a wire routing tool 300, which is connected with the layup robot 110.

Figure 3:
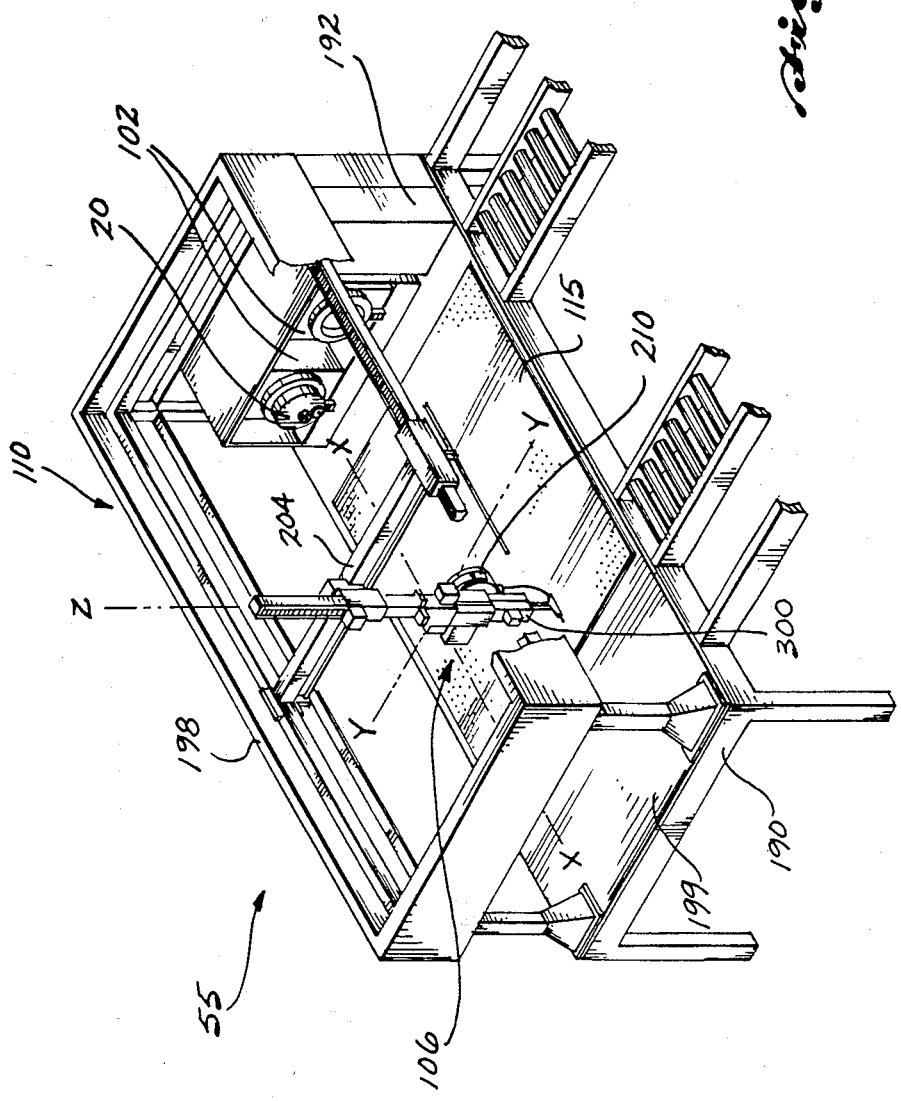
FIG. 3 is an isometric view of the wire queuing and wire layup subsystems of the wire harness assembly system.

The layup robot 110 includes a rectangular table 190, having a frame 198 supported above and parallel to the table's surface. Mounted between the oppositely disposed major sidewalls of the frame 198 is a beam 204 that can be driven along the length of the sidewalls in the x direction (FIG. 3) of a Cartesian coordinate system. Depending downwardly from the beam 204 is a manipulator arm 106 that can be driven along the length of the beam in the y direction. The manipulator arm 106 can also be rotated about its longitudinal axis (z axis in FIG. 3) and can be moved upwardly and downwardly.

B. The Wire Routing Tool

The present invention is directed to a tool 300 that is connectable to the layup robot 110 and functions to grasp and carry a wire that has been pre-cut to a predetermined length and has had its ends terminated. The tool can hold the wire while allowing the wire to move longitudinally guided by movement of the tool. The tool also includes mechanisms for forcing the wire to move longitudinally in either direction so that its terminal end can be inserted into a connector of the harness when the tool is positioned adjacent the connector by the robot. After one end of the wire is inserted into a connector, the tool is moved to the other connector along the particular path the wire is to assume in the wire harness. The tool then inserts the second end of the wire into that connector.

Figure 4:
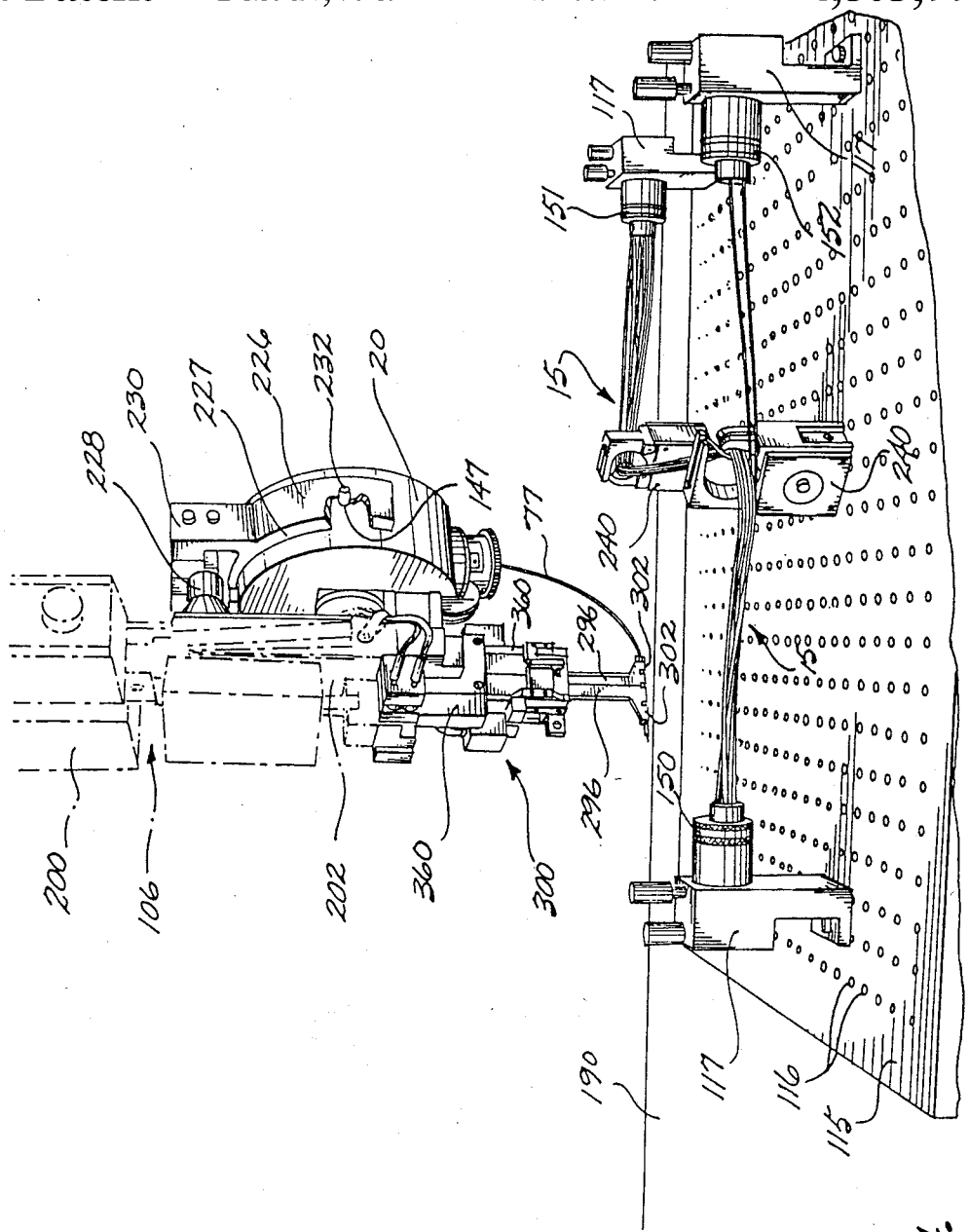
FIG. 4 is an isometric view of the manipulator arm of the layup robot positioned over a form board.

As is best shown in FIG. 4, a wire routing tool 300 of the present invention is releasably attached to a jaw unit 202 depending from the main member 200 of the manipulator arm 106. The tool 300 preferably includes two substantially identical legs 296 that extend downwardly from a housing 360, mounted to the jaw unit 202. Each leg 296 is pivotally mounted within the housing 360 and the legs 296 can be independently swung about pivot points to move the lower end of that leg toward or away from the other leg. Integrally formed in the lower end of each leg 296 is an extending foot 302 that includes a downwardly facing groove 344 that serves as a wireguide. When the legs 296 are swung together (FIG. 4), the feet 302 and grooves are aligned. Each foot 302 can independently grasp (clamp) a wire that passes through the groove of that foot or can allow the wire to slide freely within the groove.

While the overall assembly system 10 can be controlled manually with the input devices of the master system computer 25, preferably the system is controlled directly from computer-assisted design (CAD) equipment used to design the particular wire harness of interest, and by a dedicated computer which manages and supervises the various tasks.

To construct a wire harness 15 with the wire layup subsystem 55, a rectangular form board 115 that includes a rectangular array of spaced holes 116 is placed on the top work surface of table 190 for access by the tool 300. Connectors 150, 151 and 152 for the wire harness are mounted within connector blocks 117 that are positioned on the form board 115. Turn gates 240, which allow bends to be formed in the wire harness even with precut wires, are also installed on the form board 115. The connector blocks 117 precisely position each connector used in the harness. The robot 110 picks up a canister 20 that contains a wire segment 77 from one of the receiving bays 102, inserting one end of the wire segment 77 into the grooves of the feet 302 of tool 300, inserts one end of the wire segment 77 into a receptacle of a connector, moves the tool 300 along a predetermined path to dispense the wire segment 77 in the harness, and inserts the second end of the wire segment into a second connector or other terminal device, before returning the empty canister 20 to the receiving bay 102. The process is repeated until the wire harness 15 is complete.

System specifics or assembly changes can be entered with the input devices to specify, for example, the location of connector blocks 117 and/or turn gates 240 on the form board 115, specific end configurations, and other data. The input devices also perform switching to begin assembly or to override the master system computer 25.

Figure 8:
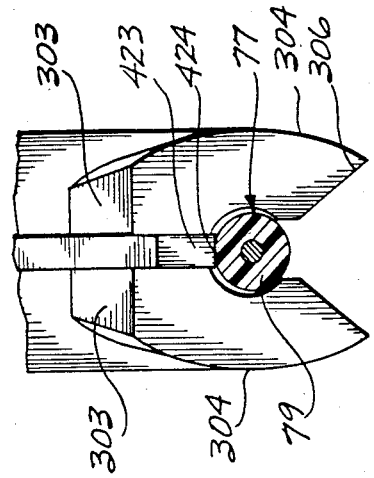
Figure 7:
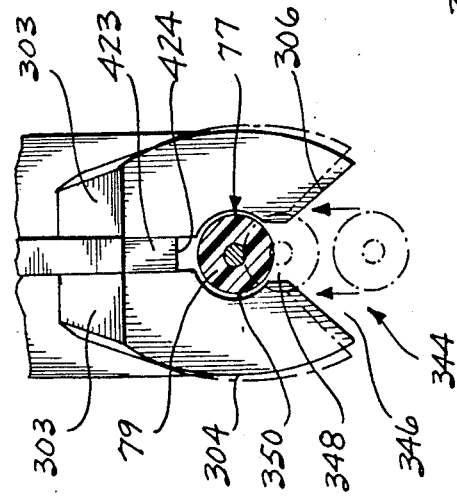

Each foot 302 (FIG. 7) includes a flat downwardly sloping upper surface 303, slightly curved side surfaces 304, and a bottom surface 306 that is substantial orthogonal to the longitudinal axis of the the leg 296. A groove 344 for receiving the wire segment 77 extends along the entire bottom surface 306 of each foot. The groove 344 includes three distinct regions: a converging entrance region 346 or throat of gradually decreasing width that extends upwardly from the bottom surface 306; a gate region 348 or constriction of relatively constant width that extends upwardly from the upper end of entrance region 346; and a circular wire guide region 350. The width of the gate region 348 is slightly less than the diameter of the smallest wire segment in the harness. Hence the gate region 348 provides a constricted passage into the wire guide region 350. The wire region is slightly wider than the largest diameter of the wire segments of the wire harness being formed. When a wire segment is moved through the entrance region 346 and forced into the gate region 348, the walls of the gate region are forced apart (shown by dotted lines in FIG. 7) until the wire passes into wire guide region 350. As shown in FIG. 8, once the wire segment 77 passes into the wire guide region 350 of the groove, the foot 302 will spring back to its original configuration to retain the wire segment 77 within the wire guide region 350 of groove until the wire segment is forcibly ejected.

The legs 296 of the tool are formed of lightweight, resilient material such as nylon, which permits the grooved, nonabrasive feet to flex when a wire is forced through the gate region of the groove. The nonabrasive aspect of the feet minimizes damage to the wire as it is forced into the groove and as it is subsequently dispensed. The tool is preferably as light as possible so that it can be precisely controlled by the robot with minimum burden on the robot's drive mechanism.

The bottom surface 306 of the feet carry spaced notches 354 (FIG. 6) that pass into each foot 302 across the entrance and gate regions of the grooves 344.

Figure 5:
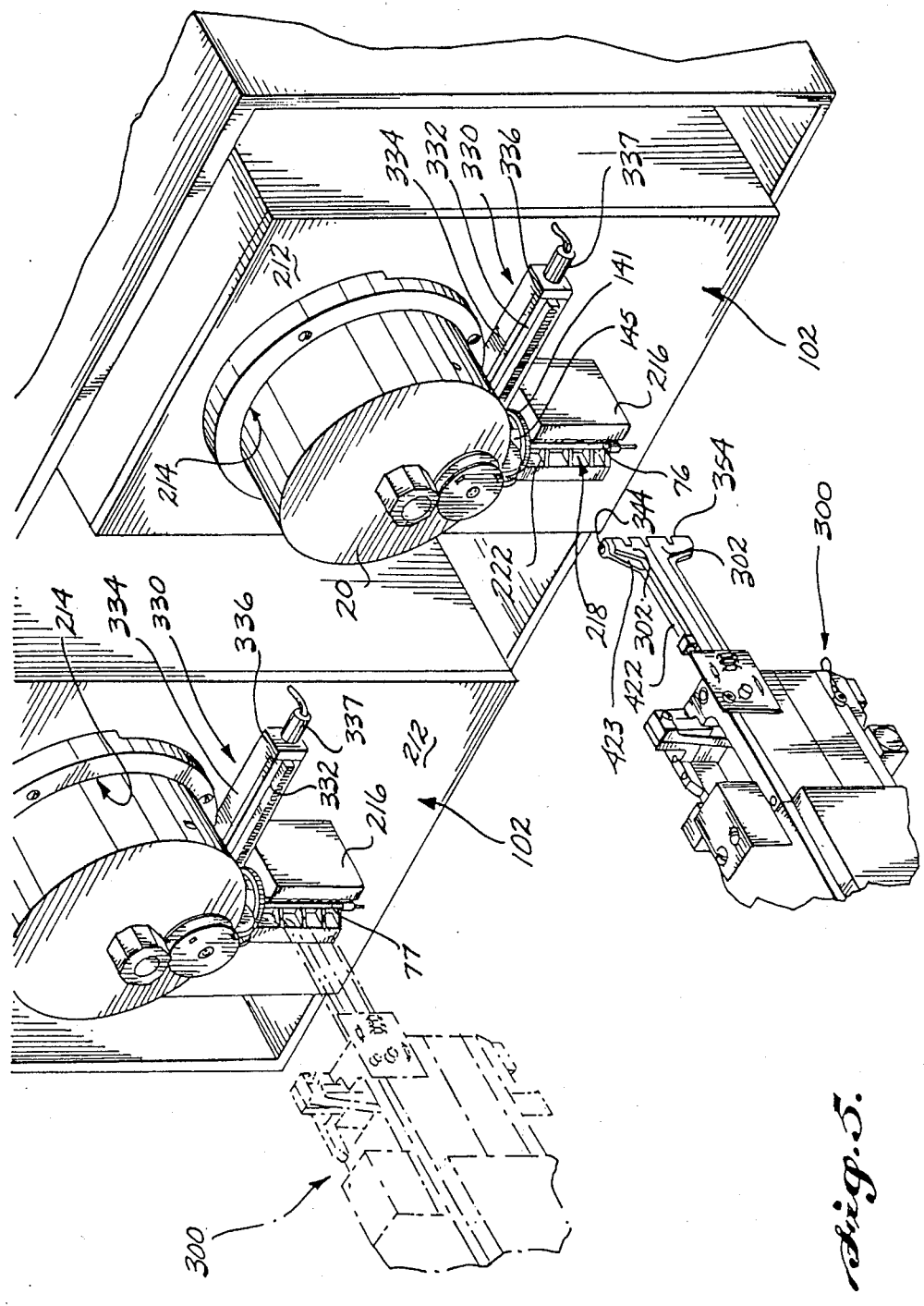
FIG. 5 is an isometric view of bays of the wire queuing subsystem.
Figure 6:
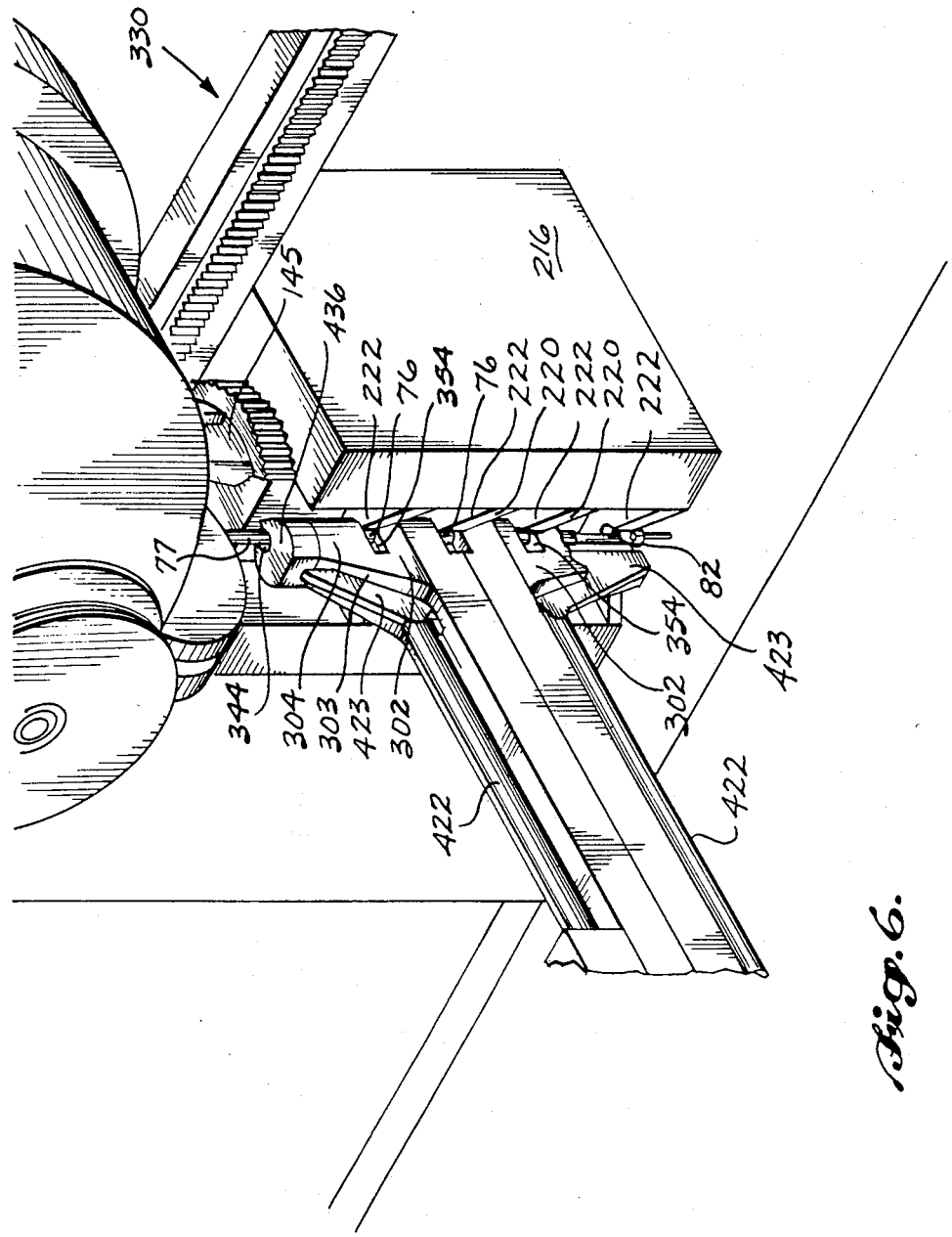
FIG. 6 is an isometric view showing the tool engaging a wire segment in a bay.

Each canister 20 in a receiving bay 102 (located at one end of table 190 of the layup robot 110) presents the leading end 76 of the wire segment 77 for grasping by the tool 300 (FIG. 5). A guide block 216 receives the leading end of the wire segment and positions the wire precisely for the robot. The guide block includes a rectangular groove 218 that extends vertically between the top and bottom of the guide block. Extending horizontally across groove 218 are a plurality of vertically spaced webs 222. Each web 222 has an inwardly directed V-shaped, centering notch 220 formed therein. When canister 20 is positioned in bay 102, the downwardly hanging leading end 76 of the wire segment passes through the aligned V-shaped grooves 220 in contact or closely adjacent the apex of each notch 222 to insert the end of a wire segment into the groove 344 formed in the feet 302. The tool 300 is maneuvered so that its feet 302 are directed into the groove 218 of the guide block 216. The webs 222 align with the notches 354 in foot 302. As the foot is moved into the guide block, the leading end of the entrance and gate regions of the groove are moved past the leading end of the wire (which is held stationary by the webs 222) until the wire slips into the wire guide region. As shown in FIG. 6, the clamp plate 423 of the foot 302 that is nearest the canister 20 carries a detector sleeve 436. A U-shaped downwardly opening groove is formed in the sleeve. The wire segment passes through that groove. The sleeve provides a dual function. First, it prevents the wire segment 77 from slipping between the clamp plate 423 and the slot in which the clamp plate is located. Second, it provides a means of detecting the trailing conductive end of the wire segment as will be explained.

It is contemplated that means alternative to those just described for acquiring the wire segment may be employed (e.g., mechanical jaws or the like). However, the grooved nylon feet employed in the preferred embodiment provide a simple, easily maintained mechanism having few moving parts. Furthermore, since the feet are a substantially rigid single pieces their position relative to the remaining portion of the tool remain fixed and can thus be more precisely maneuvered by the robot, which must be informed of the exact location of the foot.

Ejecting a wire segment 77 from the groove 344 or clamping of the wire segment 77 so that it cannot slide through the foot 302 is effected by a clamp rod 422 that passes along the outer edge of each leg 296 (FIGS. 5-7) and includes a flat clamp plate 423. The bottom edge of the clamp plate 423 is positioned within a slot 352 formed in the foot. The bottom edge of the clamp plate faces the wire segment 77 that is contained in groove 344.

Figure 9:
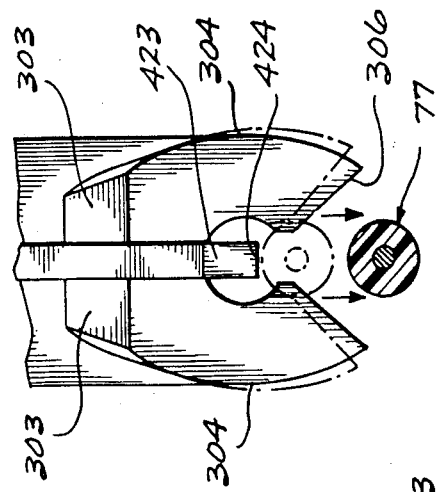
FIGS. 7, 8 and 9, are end views of a foot of the routing tool showing grasping release and ejection of a wire.

When the clamp plate 423 is moved toward the bottom of the foot 302, the plate forces the wire segment 77 against the upper end of the gate region 348, and serrations 424 formed in the edge of the clamp plate press against the insulative coating 79 of the wire segment 77 to clamp the wire segment in the foot (FIG. 8). If clamp plate 423 is moved further downwardly, the wire segment 77 is forced through the gate region 348 and falls from the tool (FIG. 9).

Once the leading end 76 of the wire is secured within the grooves 344, rim chuck 145 of the canister is rotated to unclamp the jaws from the wire segment so that the wire segment may be drawn from the canister 20. The rotation of the chuck is effected by a gear drive assembly 330 that is mounted to the canister support wall 212. The gear drive assembly includes a linear rack gear 332 slidably mounted to wall 212 and an actuator 334 (FIG. 5). The actuator 334 includes a tension spring that is connected to the rack gear to bias the rack gear against a stop 336 formed in an end of the actuator. The rack gear is positioned so that its teeth mesh with the gear 141 of the rim chuck 145 of the canister. The actuator also includes pneumatic piston and cylinder assembly 338 that is connected to the actuator and rack gear so that when pressurized air is introduced into that assembly the rack gear will slide away from the stop 336 thereby causing the gear 141 to rotate thereby releasing the jaws from the wire segment.

Next, the canister is secured to the manipulator arm 106 by means of the previously mentioned clamp 210. More particularly, with reference to FIG. 4, the clamp 210 includes a conventional pneumatic actuator 228, such as manufactured by Unimation Corp. of Danbury, Conn., that is fastened to and extends outwardly from the jaw unit 202 of the manipulator arm. Two clamp members 226 are fastened to the outermost end of the pneumatic actuator. Each clamp member 226 comprises an elongate arcuately-shaped arm 227 and an integrally formed boss 230 projecting from the convex side of the arcuately-shaped arm. The outermost end of the boss 230 is fastened to the outermost end of the pneumatic actuator 228. The clamp members 226 are arranged so that the arcuately-shaped arms 227 can close around the top one-half of the canister when the manipulator arm is moved sufficiently close to the canister. Each arcuately-shaped arm 227 of the clamp members carry an inwardly-projecting stud 232 shaped to fit within a hole 146 in the canister.

The bosses 230 of the clamp members 226 are joined by a tension spring (not shown) to bias the two clamp members toward each other into a position wherein the arcuately-shaped portions 227 of the clamp members fit over the canister 20 with the studs 232 received in the holes 146 in the canister housing. When supplied with pressurized air, the pneumatic actuator 228 spreads the clamp members apart. Thus, in order for the manipulator arm to secure a canister to itself, pressurized air is supplied to the pneumatic actuator 228 by pneumatic circuits, thereby spreading the clamp members 226 apart. The manipulator arm is then moved sufficiently close to the canister 20, so that the clamp members are adjacent to the canister. The supply of air to the pneumatic actuator is reversed, causing the clamp members to move toward each other and close around the canister as described above. The canister 20 is thus secured to the manipulator arm 106 so that it can be pulled from the bay 102 and carried therewith while the wire segment that is coiled inside the canister is placed into position within the wire harness. The spring ensures that the clamp will remain closed should the air supply be lost.

When a loaded canister secured to the manipulator arm, and the leading end 76 of the wire segment secured in the feet of the tool 300, the layup robot 110 is ready to begin the process of positioning the wire segment into the wire harness 15.

Figure 10:
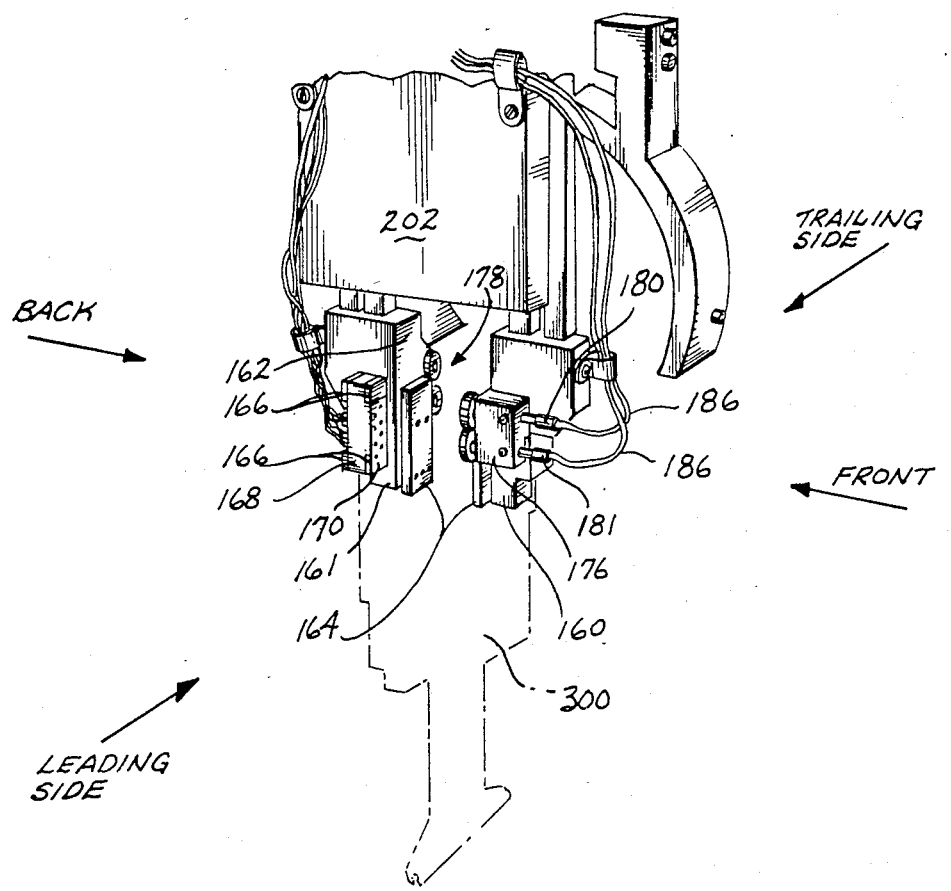
FIG. 10 is another isometric view of the manipulator arm of the layup robot, illustrating connection with the routing tool.

Referring to FIGS. 10 and 11, when the tool 300 is mounted to jaw unit 202, the upper end of the tool (shown in broken lines in FIG. 10) is held between the jaws 160, 161 of the manipulator arm. For clarity of description, the tool 300 will be referred to as having a front, back, a leading side and a trailing side as indicated in FIG. 10. Correspondingly, the jaw 160 of the manipulator arm that engages the front of the tool 300 will be referred to as the front jaw, while the jaw 161 that engages the back of the tool will hereinafter be referred to as the back jaw. Both jaws have leading sides and trailing sides corresponding to the leading side and trailing side of the tool.

Guide plates 164 are fastened to the flat facing surfaces 162 of the jaws 160, 161. The guide plates extend outwardly from the jaws. When the jaws are closed around the upper end of the tool 300, the guide plates fit within correspondingly-shaped openings 318, 319 that are formed in the grips 312, 313 of the tool, thereby firmly securing the tool to the manipulator arm.

The back jaw 161 carries four spaced brackets 166 on its leading side that hold an electrical terminal block 168 to the back jaw 161. The terminal block has a flat inner surface 170 and outer surface 171. The inner surface 170 is substantially coplanar with the facing surface 162 of the back jaw 160 of the manipulator arm. A plurality of electrical contact sleeves 174 are formed in the terminal block. The sleeves 174 extend through the terminal block between its inner and outer surfaces. Electrical wires 172, suitable for carrying signals between the tool and the master system computer 25 are connected to the sleeves at the outer surface 171 of the terminal block. At the inner surface 170 of the terminal block the sleeves 174 mate with contact posts that are located on the tool and described below.

The jaws 160, 161 of the manipulator arm are further adapted to carry pneumatic junction boxes that rigidly support pneumatic conduits in precise position for mating with associated ducts in the tool. These pneumatic conduits provide pressurized air for actuating the clamp rods 422 and positioning each leg 296 of the tool 300. More particularly, a front pneumatic junction box 176 is fastened to the leading side of the front jaw 160 of the manipulator arm. Two rigid tubular pneumatic conduits 180, 181 extend through junction box 176, projecting outwardly from its outer surface 182 and its inner surface 184. Connected to the portion of each conduit 180 and 181 that extends from the outer surface 182 is a flexible pneumatic tube 186. The pneumatic tubing is fastened to and extends along the manipulator arm 106 and the frame 198 of the layup robot to a source of pressurized air. Conventional solenoid valves are connected to the flexible pneumatic tubing 186. The solenoid valves (not shown) are controlled by the layup robot 110 to control the flow of air to the tool for independent positioning of legs 296 and clamp rods 422 in the described manner herein.

The portion of each rigid pneumatic conduit 180 and 181 that extends beyond the inner surface 184 of the pneumatic junction box 176 is equipped with an annular fitting 188 that faces tool 300. When the tool 300 is held between jaws 160 and 161 of the manipulator arm, O-ring seals, contained in the annular fittings, provide an airtight connection between the conduits 180, 181 and hereinafter described ducts 194, 195 that are formed in tool 300.

The back jaw 161 of the manipulator arm 106 carries a pneumatic junction box 176 and associated pneumatic conduits and tubing that is substantially identical to the junction box 176, its associated conduits 180 and 181 and the pneumatic tubing 186. As shall be described, the back pneumatic junction box 178 is positioned to provide a pair of rigid pneumatic conduits that mate with hereinafter described ducts 260, 261 of tool 300. Hydraulic, electrical, mechanical or electromechanical means for actuating the tool can be employed as an alternative to the preferred pneumatic means.

As shown in FIGS. 11-14, the tool includes a housing 360 to which the remaining elements of the tool are directly or indirectly attached. Specifically, the housing is a four-sided open-ended rectangular-shaped box formed of rigid, lightweight material, such as aluminum. The housing has a front sidewall 362, a back sidewall 364, a leading sidewall 366 and a trailing sidewall 368.

The front grip 312 is fastened to the front sidewall 362 of the housing 360 and includes a rectangular opening 318 for receiving the guide plate 164 of the front jaw 160 of the manipulator arm. A pneumatic junction box 196 is formed on the upper leading edge of the grip 312 and houses the ducts 194 and 195 that mate with the pneumatic conduits 180, 181 of the front junction box 176 on the manipulator arm. The opposite ends of the ducts 194 and 195 are connected to flexible pneumatic tubes 403 and 404 respectively which in turn are connected to pneumatic actuators 402 and 416.

The back grip 313 is fastened to the back sidewall 364 of the housing 360 and includes rectangular opening 319 sized to receive the guide plate 164 that is mounted on the back jaw 161 of the manipulator arm. The back grip 313 carries a second pneumatic junction box 262 on its upper trailing edge, which is substantially identical to the first pneumatic junction box 196, including internal ducts 260 and 261 for supplying flexible pneumatic tubes 403 and 404 respectively, with pressurized air that is received from the pneumatic junction box 178 of the manipulator arm 106 to pneumatic actuators 402 and 416.

The upper leading edge of the back grip 313 carries a pair of outwardly projecting spaced studs 320. An electrical terminal block 322 is fastened between the studs 320, and includes outwardly projecting contact posts 324 that mate with the electrically conductive sleeves 174 of the terminal block 168 of manipulator arm back jaw 161. Connected to the various terminals of the terminal block 322 are wires which interconnect microswitches 148 and 440 that are positioned on the tool with the microprocessor of the layup robot, which controls manipulator arm 106 and tool 300.

A mounting block 370 that pivotally attaches the legs 296 to the housing 360 is fastened within the upper end of the housing 360. The mounting block 370 is substantially T-shaped in cross section, having an upper, plate-like portion that extends between the four sidewalls, and has an integrally formed, downwardly depending stem 372 that extends between the leading sidewall 366 and the trailing sidewall 368. The cross-sectional width of the stem 372 is roughly one-half the width of the rectangular upper portion of the mounting block.

As is shown in FIG. 14, the upper portion 374 of each leg 296 has a pair of upwardly-projecting rectangular yoke members 380 that straddle the stem 372 of the mounting block. A pivot pin 382 passes through both yoke members 380 and the stem 372. The pivot pins 382 are substantially parallel to the leading and trailing sidewalls (366 and 368).

Referring to FIG. 13, the legs 296 are prevented from swinging inwardly beyond substantially vertical (referred to herein as the "retracted position") by a cylindrical stop pin 388 that is connected between the front and back sidewalls of the housing 360 and passes between the legs 296. A semi-circular recess formed in the inner side 384 of each leg 296 partially surrounds and abuts the surface of the pin 388 when the leg is in the retracted position.

The amount by which each leg 296 can be swung away from the vertical or retracted position is limited since outward swinging movement brings the outer side 385 of the upper portion of the leg into contact with the adjoining sidewall (366 of 368). In the currently preferred embodiment of the invention, the maximum swing of each leg 296 from vertical (into an "extended" position) is approximately 20 degrees. A notch 390, formed in the uppermost edge of the inner surface of each leg permits movement of the portion of the legs that extend above the pivot pins 382 without contacting the corresponding portion of the other leg.

The pivotal motion of each leg 296 between its retracted position and extended position is controlled by a spring 400 and a pneumatic actuator 402. The spring 400 (FIG. 13) is confined within a cylindrical chamber 404, half of which is formed in the inner side 384 of each leg 296 at a position slightly below the bottom edge of housing 360 and biases each leg toward the extended position. Each pneumatic actuator 402 (e.g., a Model AV12-3, manufactured by Festo, of Germany) is fastened to the lower part of the housing 360, being located so that its actuator piston 406 is aligned with the spring 400. A headed fastener 407 is threaded into the outer side of each leg 296 in longitudinal alignment with the central axis of spring 400. Since one of the actuators 402 is connected to the duct 194 of the junction box 196 by flexible pneumatic tube 403 and the second actuator 402 is connected to the duct 260 of the junction box 262 (by flexible pneumatic tube 403), the pistons 406 of the pneumatic actuators 402 can be independently actuated to thrust outwardly against the head of the adjacent fastener and, to move each respective leg 296 into the retracted position. Both actuators can operate simultaneously.

With reference to FIGS. 13 and 14, the middle portion 376 of each leg 296 is integrally formed with the upper portion 374, and has a rectangular opening 410 that extends between the inner side 384 and the outer side 385 of the leg. A support frame 412 is fastened to the outer side 385 of the middle portion of each leg. Each support frame 412 includes an integrally formed flat bracket 414 that extends orthogonally from the frame into the upper portion of the opening 410 of the leg 296 to which it is mounted. A pneumatic actuator 416, such as Model AV12-4, manufactured by Festo, of Germany, is mounted to the underside of the upper bracket 414 such that its piston 417 (FIG. 13) is directed downwardly. Pneumatic tubes 404 extend from an elbow fitting 407 on the actuators 416 to respective ducts 195 or 261 on the respective junction boxes 196 or 262.

Each support frame 412 also includes a lower bracket 418 that projects inwardly into a recess 420 formed in the lower wall of the leg opening 410 that adjoins the support frame. Each lower bracket 418 includes a hole that is aligned with the piston 417 of the pneumatic actuator 416 that is positioned within the opening 410. The upper end of one of the cylindrical clamp rods 422 passes through the hole in the lower bracket. Mounted to the uppermost end of each clamp rod is a cap 124 having a flanged top 424. A spring 426 circumferentially surrounds the upper end of each clamp rod between the lower bracket 418 and the flanged top 424 of the cap to bias the clamp rod upwardly.

Each clamp rod 422 extends downwardly along the lower portion 378 of the associated leg 296, being loosely secured to the outer side of the leg by a U-shaped bracket 428 that extends outwardly from the leg. The clamp plate 423 of each rod 422 extends into the slot 352 of the foot 302.

Since the springs 426 urge the clamp rods upwardly, it can be recognized that each clamp plate 423 is biased in the release position discussed earlier and is moved into the clamp and eject positions when the piston 417 of actuator 416 is activated to push downwardly against the cap 124 on top of the clamp rod 422.

For proper control of the tool 300, a status signal that indicates whether each leg 296 is retracted and a status signal that indicates whether each clamp plate 423 is in the release position is transmitted to the layup robot microprocessor. Accordingly, a microswitch 440 on the lower end of the support frame 412 of one leg 296 has a switch actuator aligned with a rod 442 that extends through a bracket 444 mounted to the support frame 412 of the other leg 296. The switch 440 is activated only when both legs 296 are in the retracted position. Another microswitch 446 is positioned within each leg opening 410 on a bracket 148 so that downward movement of the clamp rod 422 causes the cap 424 to activate (i.e., open) the switch and to supply the required status signal for that leg to the microprocessor.

C. Laying Up A Wire

Wire reference to FIGS. 15-18, when the manipulator arm moves from a receiving bay 102 to the leading end connector 150, the tool 300 holds both legs in the retracted position with the plates 423 clamped. With the leading end of the wire segment 77 aligned for insertion into the correct aperture of the connector 150, the leg 296 farthest from the connector 150 releases the wire and moves to the extended position. That leg 296 reclamps the wire and returns to the retracted position while the other leg releases the wire. The wire, accordingly, slides through the leg nearest the connector and the terminal 82 of that wire is guided in a straight line into the connector 150. These steps may be repeated as necessary to ensure engagement of the wire within the connector. The connection is tested to ensure that the connection is complete and the wire is secured.

Then, both legs 296 are retracted, and both clamp plates 423 are released to allow the wire segment 77 to slide freely as the layup robot routes the wire segment along its predetermined path.

Preferably the tool 300 includes an electrostatic detector to detect the arrival of the conductive terminal 83 of the trailing end 78 of the wire segment at the entrance of the groove 344. Such a detector is necessary when the tailing end of the wire segment is to be inserted into a precise position within a connector.

Figure 19:
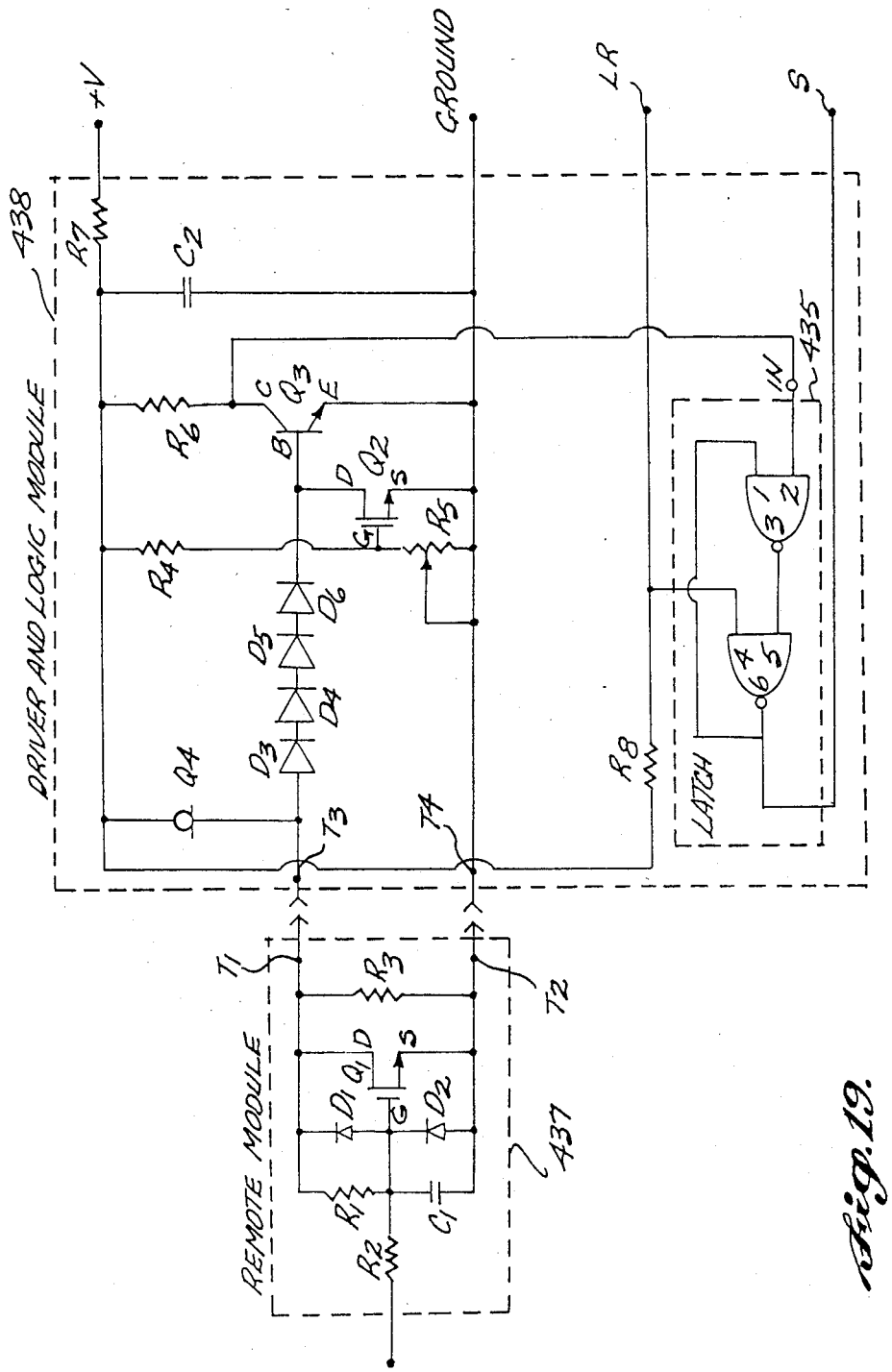
FIG. 19 is a schematic diagram of a detector circuit associated with the second leg of the tool of FIG. 11; and, FIG. 20 is an isometric view showing the tool inserting the end of a wire segment into an end connector held in a connector block.
Figure 20:
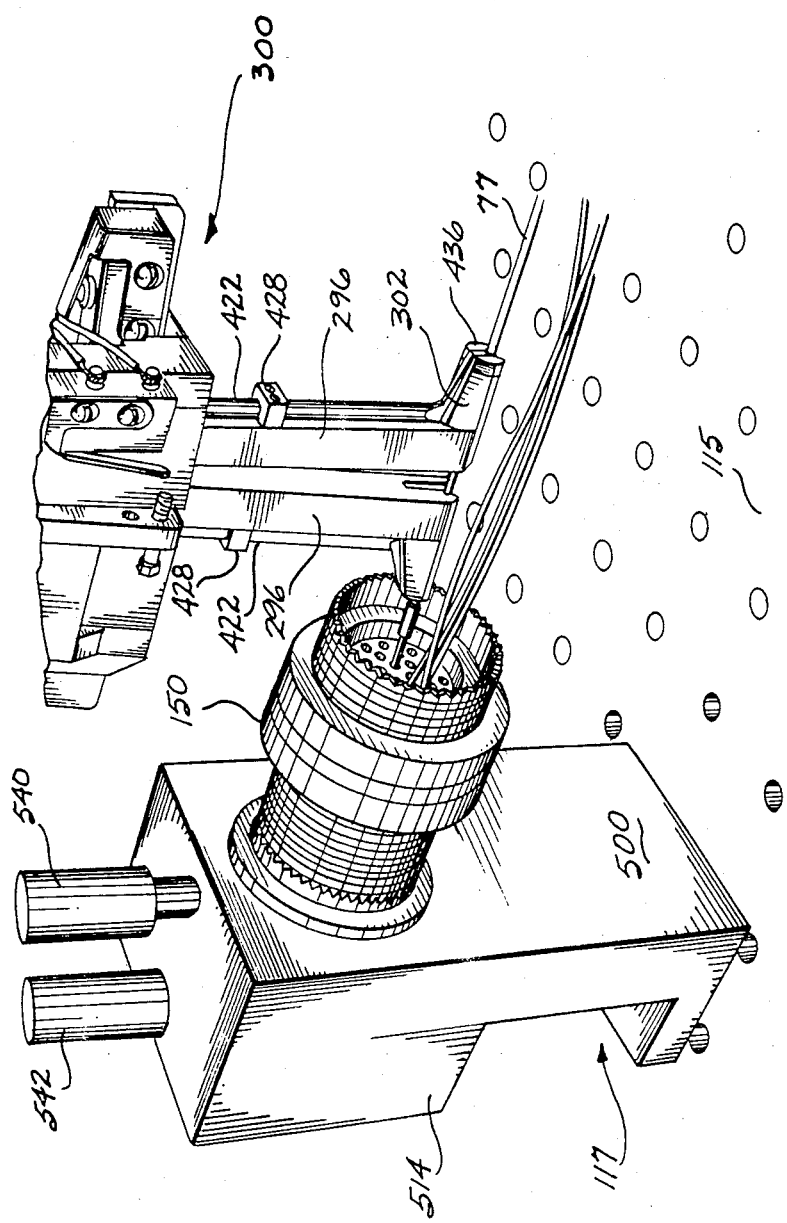

The detector circuit (FIG. 19) includes a remote module 437 mounted on the support frame 412 and a driver and logic module 438 located on the layup robot 110. A cable provides electrical connection between terminals T1 and T2 of the remote module 437 and terminals T3 and T4, respectively, of the driver and logic module 438. Although not shown, the cable is routed along the manipulator arm 106 and frame 198 of the wire layup robot 110. The driver and logic module is connected to the system power supply through the terminals designated "+V" and "ground" and is connected to the microprocessor of the wire layup subsystem through a latch reset terminal LR and a status terminal S.

In its ready mode, a steady state condition exists in which current flows from a constant current source Q4 (such as a IN5290 diode) through an insulated gate field-effect transistor Q1 that is maintained in the on state when a capacitor C1 is fully charged. The capacitor and transistor are connected with the detector sleeve 436 via a bleed resistor R2 and a lead 439 that is connected to the plate 423. As the wire segment 77 is being dispensed by the tool, it travels in contact with a conductive detector sleeve 436. The electrical potential of the detector sleeve (induced by charge stored by capacitor C3) remains relatively constant as long as the insulative coating 79 of the wire segment 77 is within the detector sleeve. As pointed out earlier, the leg 296 that carries the clamp rod 422 and detector sleeve 436 is formed of non-conductive (nylon) material. When contact is made between the detector sleeve 436 and the conductive terminal 83 of the trailing end 78 of the wire segment 77, the electrical potential of the detector sleeve decreases causing the charge stored by capacitor C1 to decrease as current flows from capacitor C1 to the detector sleeve. As a result, the potential at the transistor gate decreases to a level sufficient to momentarily turn off the field-effect transistor, while the capacitor C1 recharges through resistor R1. When field-effect transistor Q1 is off, the potential at the junction current source Q4 and resistor R1 is sufficient to cause forward current through a series of diodes (D3, D4, D5, and D6) and to turn on a switching transistor Q3, which causes the collector of transistor Q3 to switch momentarily from its high condition (approximately V+) to its low condition (slightly above ground potential) to set a status signal at terminal S.

The bleed resistor R2 slows the bleed of charge from the capacitor C1 to control the time constant of the transient pulse. The component values of resistor R1 and capacitor C1 determine the stability and sensitivity of the system. Diodes, D1 and D2, and resistor R3 protect transistor Q1 from potentially harmful transients.

In the driver and logic module 438, the diodes D3, D4, D5 and D6 provide a potential at the junction between the current supply Q4 and diode D3 that is sufficient to operate the remote module 437 (when the terminal 83 is detected). To ensure that reverse current flow through the diodes D3, D4, D5 and D6 cannot switch transistor Q3 to the on state, a second insulated gate field-effect transistor Q2 is connected between the base electrode of transistor Q3 and ground. A voltage divider network consisting of resistor R4 and variable resistor R5 biases the gate electrode of transistor Q2 so that reverse current flow through diodes D3-D6 is shunted to ground through the transistor Q2.

The latch 435 (FIG. 19) is of conventional design and is connected in such a way that, when a low appears on pin 2 as a result of transistor Q3 switching low, the latch output on pin 6 also goes low, supplying a status signal that indicates detection of the trailing end of the wire segment. A momentary low on the latch reset input (pin 4) via the latch reset terminal LR returns the latch to the ready mode.

Resistor R6 is the load resistor for transistor Q3, and resistor R8 maintains latch reset terminal 4 at approximately V+, in the absence of a reset signal. Capacitor C2 provides sufficient current drive to ensure that the pulse is passed through the circuit and is detected. Resistor R7 and capacitor C2 also provide noise filtering.

In operating in conjunction with tool 300, the microprocessor of the wire layup subsystem 55 supplies a signal to the latch reset terminal LR to place the detector circuit in the ready state at any convenient time prior to reaching the end of a wire segment 77. When the terminal 83 of the trailing end 78 of the wire segment contacts the sleeve 436, the detector circuit supplies the microprocessor with the detection status signal. Responsive to signals then supplied by the microprocessor, the tool 300 clamps the wire and positions the robot 110 and tool 300 so that the terminal 83 is aligned with the correct aperture in the trailing end connector. The legs operate in a similar manner as described with respect to the leading end connector to insert the terminal 83 into the connector. Then, the clamp plates 423 of both legs 296 are moved to the eject position to push the wire segment 77 from the tool. The empty canister 20 is then returned to the bay 102 so that another loaded canister 20 can be obtained by the manipulator arm 160 for installation of the next wire segment 77.

While a preferred embodiment has been shown and described, those skilled in the art will recognize alterations, modifications, and variations that might be made to these embodiments without departing from the inventive concept. Therefore, the claims should be interpreted liberally to protect the described embodiments and their reasonable equivalents. The description and drawings are meant to illustrate the invention and are meant to limit the invention only insofar as limitations are necessary in view of the pertinent prior art.

The embodiments of the invention in which an exclusive property or privilege is claimed are defined as follows:

1. A method of routing a wire with a robot into a particular position in a wire harness assembly, wherein the wire harness assembly includes at least one connector having a plurality of pin-receiving points, comprising the steps of:
   (a) cutting the wire to a predetermined length;
   (b) terminating both ends of the wire length, at least one end being terminated with a pin;
   (c) positioning the pin of the wire with a robot adjacent to the connector, including the substeps of:
      (1) acquiring the terminated wire with a tool on the robot;
      (2) moving the robot to position the tool adjacent to the connector;
      (3) identifying a predetermined, pin-receiving point on the connector with the robot; and
      (4) positioning the pin end of the wire with the robot in alignment with the predetermined pin-receiving point;
   (d) inserting the pin of the wire with the robot into the first predetermined pin-receiving point on the connector, including the substeps of:
      (1) securing a first point of the wire with a first foot of the tool;
      (2) sliding a second foot of the tool to a second point of the wire removed from the first point;
      (3) securely holding the wire at the second point with the second foot;
      (4) moving the second foot from the second point to a point adjacent the first foot while allowing the wire to slide through the first foot to insert the wire into the connector;
   (e) thereafter laying the wire with the robot into its particular position within the wire harness assembly; and
   (f) releasing the wire from the robot.

2. The method of claim 1 further comprising, prior to releasing the wire, the steps of:
   (a) positioning a second end of the wire with the robot adjacent to a second connector; and
   (b) inserting the second end into the second connector with the robot.

3. The method of claim 1 further comprising the steps of repeating steps (a) through (f) for a second wire in the wire harness assembly, but connecting the second wire to a second, predetermined, pin-receiving point on the connector.

4. A method for making a wire harness assembly, comprising the steps of:
   (a) positioning a plurality of connectors on a form board;
   (b) positioning at least one turn gate on the form board;
   (c) selecting a first wire for the harness;
   (d) marking the wire;
   (e) cutting the wire to a predetermined length;
   (f) pin terminating the pre-cut wire at both ends;
   (g) inserting a first pin end of the terminated wire into a first connector on the form board;
   (h) routing the wire over the form board through the turn gate to a second connector; and
   (i) inserting a second pin end of the terminated wire into the second connector, wherein each inserting step includes:
      (1) securing a first point of the wire with a first foot of a robot;
      (2) sliding a second foot of the robot to a second point of the wire removed from the first point;
      (3) securely holding the wire at the second point with the second foot;
      (4) moving the second foot from the second point to a point adjacent the first foot while allowing the wire to slide through the first foot to insert the wire into the connector.

5. The method of claim 4 further comprising the steps of:
   (a) selecting a second wire;
   (b) cutting the second wire to a predetermined length;
   (c) marking the second wire;
   (d) pin terminating the pre-cut, second wire;
   (e) inserting a first pin end of the terminated, second wire into the first connector;
   (f) routing the second wire over the form board through the turn gate to a third connector; and
   (g) inserting a second pin end of the second wire into the third connector.

6. The method of claim 5 wherein the steps of pin terminating, inserting the first pin end, routing, and inserting the second pin end for both the first and second wires are done robotically.

7. A method for making a wire harness assembly using a robot, comprising the steps of:
   (a) cutting a wire for the harness to a predetermined length;
   (b) pin terminating both ends of the cut wire;
   (c) acquiring the terminated wire with the robot;
   (d) moving the wire adjacent a firt connector with the robot;
   (e) identifying the location of a predetermined pin receiver on the first connector with the robot;
   (f) inserting a first pin end of the wire into the pin receiver with the robot, including the substeps of:
      (1) aligning the pin end with the pin receiver;
      (2) clamping the wire with a first foot of the robot;
      (3) moving a second foot of the robot to a position away from the first foot;
      (4) clamping the wire with the second foot of the robot;
      (5) unclamping the wire with the first foot; and
      (6) moving the clamped second foot to a position adjacent the first foot while permitting the wire to slide through the first foot;
   (g) routing the wire to a second connector;
   (h) identifying the location of a predetermined pin receiver on the second connector with the robot;
   (i) inserting a second pin end of the wire into the pin receiver of the second connector with the robot; and
   (j) releasing the wire from the robot.

8. The method of claim 7 wherein the step of routing includes bending the wire at least once.

9. The method of claim 8 wherein the step of releasing the wire includes ejecting the wire from both feet of the robot.

10. The method of claim 9 wherein the step of acquiring the wire includes clipping the wire into a wire guide region fabricated into both feet of the robot.

* * * * *